United States Patent
Duijve

(10) Patent No.: US 7,323,676 B2
(45) Date of Patent: Jan. 29, 2008

(54) COLOR PHOTOSENSOR WITH COLOR FILTERS AND SUBTRACTION UNIT

(75) Inventor: Rene Duijve, Eindhoven (NL)

(73) Assignee: Lumileds Lighting US, LLC., San Jose, CA (US)

( * ) Notice: Subject to any disclaimer, the term of this patent is extended or adjusted under 35 U.S.C. 154(b) by 65 days.

(21) Appl. No.: 10/489,044

(22) PCT Filed: Jul. 29, 2002

(86) PCT No.: PCT/IB02/03194

§ 371 (c)(1), (2), (4) Date: Mar. 8, 2004

(87) PCT Pub. No.: WO03/023340

PCT Pub. Date: Mar. 20, 2003

(65) Prior Publication Data

US 2004/0251404 A1 Dec. 16, 2004

(30) Foreign Application Priority Data

Sep. 11, 2001 (EP) .................................. 01203429

(51) Int. Cl.
- H03K 17/78 (2006.01)
- H01L 31/00 (2006.01)
- G01J 3/50 (2006.01)

(52) U.S. Cl. ............... 250/226; 250/214 R; 250/208.1; 382/162; 382/167

(58) Field of Classification Search ................ 250/226, 250/208.1, 214 R; 348/272, 273, 276, 280; 356/416; 382/162, 167

See application file for complete search history.

(56) References Cited

U.S. PATENT DOCUMENTS

| | | | |
|---|---|---|---|
| 4,700,080 A | | 10/1987 | Fukaya et al. .............. 250/578 |
| 5,406,066 A | * | 4/1995 | Steinle et al. ............ 250/208.1 |
| 5,708,264 A | * | 1/1998 | Hawkins et al. ............ 250/226 |
| 5,773,814 A | * | 6/1998 | Phillips et al. ........... 250/208.1 |
| 5,889,277 A | * | 3/1999 | Hawkins et al. ......... 250/208.1 |
| 6,008,843 A | * | 12/1999 | Yu .............................. 348/274 |
| 6,160,593 A | * | 12/2000 | Nakakuki ................... 348/713 |
| 6,211,521 B1 | * | 4/2001 | Bawolek et al. ........ 250/339.02 |
| 6,448,550 B1 | * | 9/2002 | Nishimura .................. 250/226 |
| 6,657,663 B2 | * | 12/2003 | Morris ....................... 348/273 |
| 6,707,937 B1 | * | 3/2004 | Sobel et al. ................ 382/162 |
| 6,727,487 B2 | * | 4/2004 | Yamaguchi et al. ..... 250/208.1 |
| 6,781,626 B1 | * | 8/2004 | Wang ......................... 348/273 |
| 6,798,896 B2 | * | 9/2004 | Watanabe et al. ........... 382/101 |
| 6,840,646 B2 | * | 1/2005 | Cornelissen et al. ........ 362/606 |

(Continued)

Primary Examiner—Davienne Monbleau

(57) ABSTRACT

The invention relates to a color photosensor for sensing the color contents of incident light. In order to provide a color photosensor which is cheap to produce and which allows the control of light in as well intensity as color a color photosensor is proposed comprising: a sensing unit (2) divided into four sensing areas (21, 22, 23, 24) each sensing the color content of incident light and outputting a sensing current, a filter unit (3) comprising four filter elements (31, 32, 33, 34) each being assigned and adapted to one of said sensing areas, said filter elements comprising a cyan colored filter element, a yellow colored filter element and a magenta colored filter element, and a subtraction unit (4) for separately subtracting each of the three sensing currents outputted from the three sensing areas to which one of said colored filter elements is assigned, from the forth sensing current obtaining color signals proportional to the red, green and blue content of said incident light.

19 Claims, 2 Drawing Sheets

Figure 1:
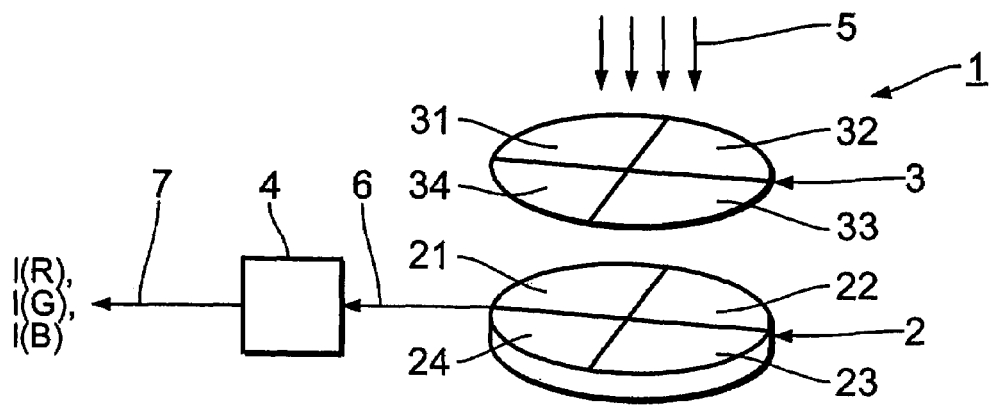

U.S. PATENT DOCUMENTS 6,847,397 B1 * 1/2005 Osada ..................... 348/273
6,876,384 B1 * 4/2005 Hubina et al. ........... 348/223.1
2004/0157140 A1 * 8/2004 Kamata et al. ............... 430/7

* cited by examiner

COLOR PHOTOSENSOR WITH COLOR FILTERS AND SUBTRACTION UNIT

The invention relates to a color photosensor for sensing the color contents of incident light. The invention relates further to a control unit for controlling the color contents of light generated by a light emitting unit, to a light emitting apparatus and to a method of sensing the color contents of incident light.

Known color sensors are manufactured by applying red, green and blue filters on top of photo diodes, either directly onto the chip or on a separate (glass) sheet. Filters can be either expensive and single bandpass or cheap, but allow for passbands outside the visible spectrum. The latter category usually shows bandpass in the infrared region. An alternative solution is the usage of complementary color filters (cyan, yellow and magenta filters) as used in image sensor applications. A color photosensor which includes a plurality of closely arranged sensor units is disclosed in U.S. Pat. No. 4,700,080. Therein each sensor includes a color filter provided at a position corresponding to that of a photoreceptor, the color filters including a red, a green and a blue filter.

One application of a color photosensor is an LED-based backlighting unit for LCD screens. By controlled mixing of red, green and blue light, emitted from Light Emitting Diodes (LEDs), a white background can be created. The major problem is that the LEDs suffer from changes in the output intensity and wavelength due to changes in temperature and operating current. Also the LED efficiency decreases in time. To keep the output light controlled in as well intensity as color, a control system is needed. The most simple system consists of three photo diodes sensing the red, green and blue part of the output light. However, as described above, current solutions are either expensive or not appropriate due to infrared sensitivity.

It is therefore the object of the present invention to provide a color photosensor which is cheap to produce and by which the light can be controlled in as well intensity as color with a high accuracy.

This object is achieved by a color photosensor as claimed in claim 1 comprising:
- a sensing unit divided into four sensing areas each sensing the color content of incident light and outputting a sensing current,
- a filter unit comprising four filter elements each being assigned and adapted to one of said sensing areas, said filter elements comprising a cyan colored filter element, a yellow colored filter element and a magenta colored filter element, and
- a subtraction unit for separately subtracting each of the three sensing currents outputted from the three sensing areas to which one of said colored filter elements is assigned, from the forth sensing current obtaining color signals proportional to the red, green and blue content of said incident light.

If the transmission of printed filters for infrared light is a problem, it can also be turned into an advantage. By using four instead of three sensing areas in the sensing unit and by equipping three of said four sensing areas with a cyan (C), yellow (Y) or magenta (M) filter element as proposed according to the invention, a simple calculation gives the wanted red, green and blue signals. If the incident flux of the incident light is called $\Phi(R)$, $\Phi(G)$ and $\Phi(B)$ for the wanted red (R), green (G) and blue (B) components and (IR) for the (unwanted) infrared (IR) component, then the outputted sensing currents will be I(W), I(C), I(Y) and I(M) respectively, where I(W) is the sensing current from the unfiltered sensing area. It can now be written:

$$I(W)=c\cdot(\Phi(R)+\Phi(B)+\Phi(G)+\Phi(IR))+Id$$

$$I(C)=c\cdot(\Phi(B)+\Phi(G)+\Phi(IR))+Id$$

$$I(Y)=c\cdot(\Phi(R)+\Phi(G)+\Phi(IR))+Id$$

$$I(M)=c\cdot(\Phi(R)+\Phi(B)+\Phi(IR))+Id$$

where Id is the dark current of the sensing areas and c is a conversion factor, i. e. the efficiency of the sensing areas.

By subtracting the C, Y or M sensing currents I(C), I(Y), I(M) from I(W) the pure and wanted R, G and B currents I(R), I(G), I(B) are obtained:

$$I(R)=I(W)-I(C)=c\cdot\Phi(R)$$

$$I(G)=I(W)-I(M)=c\cdot\Phi(G)$$

$$I(B)=I(W)-I(Y)=c\cdot\Phi(B).$$

Preferred embodiments of the invention are included in the dependent claims. A control unit for controlling the color contents of light generated by a light emitting unit comprising a color photosensor according to the invention as well as a control signal generation means is claimed in claim 8. The invention relates further to a light emitting apparatus as claimed in claim 10 comprising a light emitting unit and a control unit as claimed in claim 8. Further, the invention relates to a method of sensing the color contents of incident light as claimed in claim 13.

In a preferred embodiment of the invention said sensing unit comprises either a photo diode divided into four sensing areas or, alternatively, four photo diodes representing said four sensing areas.

Preferably, said filter elements are provided by simply printing colors onto the surface of the sensing unit, i. e. by printing a cyan color, a yellow color or a magenta color onto the surface of the corresponding sensing area. The filter elements may also comprise printed or plastic color sheets put on top of the sensing unit. One or more layers can be applied between the filter elements and the sensor unit surface to protect the surface and/or to improve the ink affixture if the filter elements are printed using different inks.

The four sensing areas may either be of equal size or unequal size. In the latter alternative the ratio of the sizes of said sensing areas are adapted such that it compensates for infrared transmission differences of the filter elements.

The filter element assigned and adapted to the fourth sensing area may either be a blank element or printed with a color correcting ink to match the wavelength dependent light transmission with the other filter elements.

By use of the control unit as claimed in claim 8 the color contents and intensities can be controlled such that white light is generated by a controlled light emitting unit. Such a control unit may preferably be used when said light emitting unit comprises light emitting diodes for emitting light of different colors, e. g. for emitting light of the colors red, green and blue, respectively.

A preferred embodiment of the invention is an LED-based LCD backlighting unit where the color photosensor according to the invention is used to determine the color point of the light mixed by the LEDs. Thus the signals generated by the color photosensor can be used to correct the white point of the mixed light through a feedback system. The invention may be used also for measuring object colors in production lines or, even more general, in almost any kind of color measurement.

Figure 2:
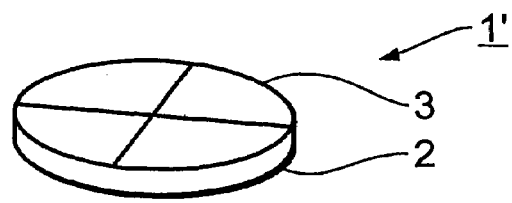
Figure 3:
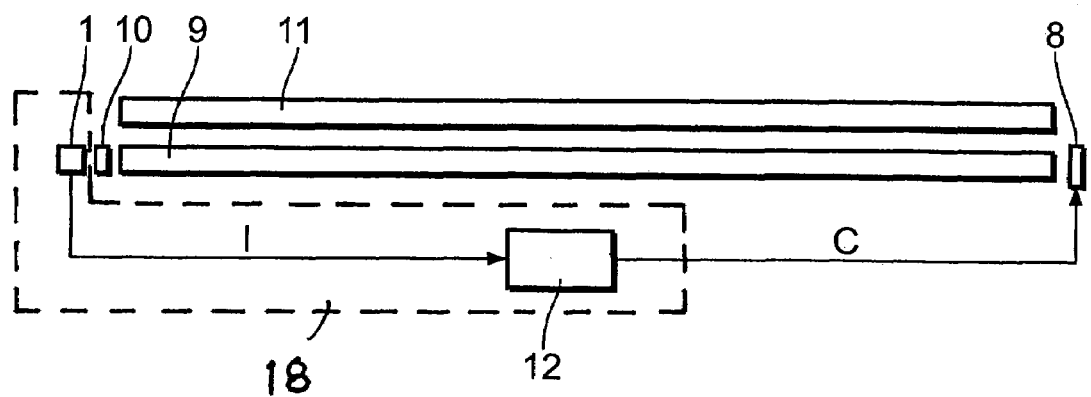
Figure 4:
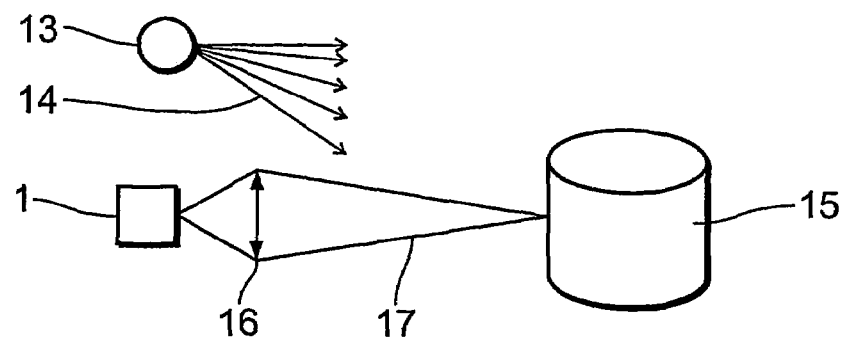
Figure 5:
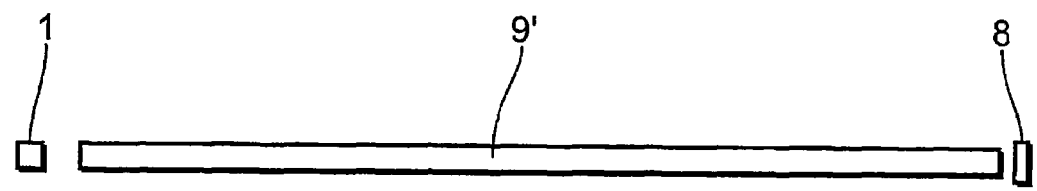

The invention will now be explained in more detail with reference to the drawings in which FIG. 1 shows a first embodiment of a color photosensor according to the invention, FIG. 2 shows a second embodiment of a color photosensor according to the invention, FIG. 3 shows an LED-based LCD backlighting unit according to the invention, FIG. 4 illustrates the use of the invention for color determination of an object and FIG. 5 illustrates the use of a color photosensor for white light mixing using LEDs.

FIG. 1 shows a first embodiment of a color photosensor 1 according to the invention. Therein the photosensor 1 comprises a sensor unit 2, a separate filter unit 3 and, schematically, a subtraction unit 4. The sensing unit 2 comprises four sensing areas 21, 22, 23,24, all being equal in size, which may either be realized by separate photo diodes or by one photo diode divided into four areas. The sensing unit 2 is covered with a filter unit 3 also consisting of four filter elements or filter areas 31, 32, 33, 34 matching the sensing areas 21, 22, 23, 24 of the sensing unit 2. One filter element, e. g. filter element 31, is left blank or printed with a color correcting ink to match the wavelength dependent light transmission with the other colored sensing areas 22, 23, 24. Furthermore, one filter element, e. g. filter element 32, is a cyan filter, one filter element, e. g. filter element 33, is a magenta filter element, and the third filter element, e. g. filter element 34, is a yellow filter element. Each filter element can be implemented by ink of the corresponding color.

The incident light 5 is thus first filtered by the filter elements 31-34. The filtered light is thereafter received by the sensing areas 21-24 of the sensing unit 2 which are each outputting a sensing current I (signal 6), i. e. the sensing currents I(W), I(C), I(Y) and I(M) as explained above are outputted by the sensing elements 21, 22, 23, 24. Said sensing currents are received by the subtraction unit 4 which separately subtracts from the sensing current I(W) outputted from sensing element 21, which received unfiltered light, the sensing currents I(C), I(M) and I(Y) of the other three sensing elements 22, 23, 24 resulting in the color signals I(R), I(G), I(B) as output signal 7 representing the red, green and blue content contained in the incident light 5.

While in the embodiment shown in FIG. 1 the sensing areas 21-24 have an equal size, the size of said four sensing areas 21-24 may also be unequal. In this case the size of said areas is adapted such that the ratio of the sensitive areas compensates for infrared transmission differences of the colored filter elements 32-34.

Another embodiment of a color photosensor 1' according to the invention is shown in FIG. 2. Therein the filter unit 3 is directly applied to the surface of the sensing unit 2. Preferably, the filter elements are directly printed onto the light sensitive surface of the sensing unit 2. In addition, one or more layers can be applied between the filter unit 3 and the sensing surface of the sensor unit 2 to protect the surface and/or to improve the affixture of the filter elements, preferably when the filter elements are implemented by printing ink onto the surface of the sensing unit 2.

An LED-based LCD backlighting unit according to the invention is shown in FIG. 3. Therein a light emitting unit in the form of an LED bar 8 consisting of a number of red, green and blue LEDs is illuminating a light guide 9. The light guide is used to mix the individual LED colors to homogeneous white light, used to illuminate the LCD panel 11. A reflective strip 10 is used on all sides but the LED side to keep the light inside the light guide 9. At a point where the light is well mixed, e. g. the side opposite the LED bar 8, a small part of the light is coupled out by making the reflective strip 10 (partly) transparent to illuminate the color photosensor 1. This sensor 1 is used to determine the color point of the mixed light. The output signals I, i. e. the color signals I(R), I(G), I(B), can then be used by control signal generation means in the form of a control signal generation unit 12 to generate a control signal C for controlling the color contents of the light generated by said LED bar 8 and thus to correct the white point of the mixed light in the form of a feedback system. Sensor 1 and control signal generation unit 12 together constitute control unit 18.

The invention may also be used for determining the color of an object. This application is illustrated in FIG. 4. Therein an object 15 of which the color has to be determined is illuminated by a (white) light source 13 emitting (white) light 14. The light 17 reflected by the object 15 is directed towards the sensor 1 by imaging optics 16. By the sensor 1 the color of the object 15 can be determined.

In another embodiment for such an application, the imaging optics 16 are left out, and directly reflected light is used by the sensor 1.

White light mixing with LEDs is shown in FIG. 5. Therein light generated by the LED bar 8 is directed onto a light mixer 9'. On one side of said light mixer 9' the sensor 1 is used to measure the color contents of the light mixed by said light mixer 9'. By a control circuit as shown in FIG. 3 the LED bar 8 can be controlled such that white light is mixed.

The invention is not limited to the application as shown in the figures and as described above. In general, the invention may be applied in almost any kind of color measurement.

The invention claimed is:

1. Color photosensor (1) for sensing the color contents of incident light, comprising:
   a sensing unit (2) divided into four sensing areas (21, 22, 23, 24) each sensing the color content of incident light and outputting a sensing current,
   a filter unit (3) comprising four filter elements (31, 32, 33, 34) each being assigned one of said sensing areas, said filter elements comprising a cyan colored filter element, a yellow colored filter element and a magenta colored filter element, and
   a subtraction unit (4) for separately subtracting each of the three sensing currents outputted from the three sensing areas to which one of said colored filter elements is assigned, from the forth sensing current obtaining color signals proportional to the red, green and blue content of said incident light,
   wherein the four sensing areas (21-24) of said sensing unit are of unequal size and wherein the ratios of the sizes of said sensing areas compensate for infrared transmission differences of the filter elements.

2. Color photosensor as claimed in claim 1, wherein said sensing unit comprises either a photo diode divided into four sensing areas or four photo diodes.

3. Color photosensor as claimed in claim 1, wherein said filter elements (31-34) are provided by printing colors onto the surface of the sensing unit.

4. Color photosensor as claimed in claim 1, wherein said filter elements (31-34) comprise printed or plastic color sheets.

5. Color photosensor as claimed in claim 1, wherein the forth filter element (31) is a color correction filter element.

6. Control unit for controlling the color contents of light generated by a light emitting unit comprising:
- a color photosensor (1) as claimed in claim 1 for sensing the color contents of light generated by said light emitting unit obtaining color signals proportional to the red, green and blue content in said incident light, and
- a control signal generation means (12) for generating a control signal for controlling the color contents of the light generated by said light emitting unit from said color signals.

7. Control unit as claim 6, wherein said control signal generation means (12) controls the color contents and the color intensities such that white light is generated by said light emitting unit.

8. Light emitting apparatus comprising:
- a light emitting unit (8) for emitting white light, the light emitting unit comprising different color components, and
- a control unit (1, 12) as claimed in claim 6.

9. Light emitting apparatus as claimed in claim 8, wherein said different color components comprises three light emitting diodes for emitting light of colors red, green and blue, respectively.

10. Light emitting apparatus as claimed in claim 8, wherein said light emitting unit comprises an LED-based LCD backlighting unit.

11. Control unit for controlling the color contents of light generated by a light emitting unit as claimed in claim 6, wherein said sensing unit comprises either a photo diode divided into four sensing areas or four photo diodes.

12. Control unit for controlling the color contents of light generated by a light emitting unit as claimed in claim 6, wherein said filter elements (31-34) are provided by printing colors onto the surface of the sensing unit.

13. Control unit for controlling the color contents of light generated by a light emitting unit as claimed in claim 6, wherein said filter elements (31-34) comprise printed or plastic color sheets.

14. Control unit for controlling the color contents of light generated by a light emitting unit as claimed in claim 6, wherein the forth filter element (31) is a color correction filter element.

15. Method of sensing the color contents of incident light, comprising the steps of:
- filtering said incident light by a filter unit (3) comprising four filter elements (31, 32, 33, 34), said filter elements comprising a cyan colored filter element, a yellow colored filter element and a magenta colored filter element,
- sensing the color contents of the filtered light by a sensing unit (2) divided into four sensing areas (21, 22, 23, 24) each outputting a sensing current, each of said filter elements being assigned to one of said sensing areas,
- separately subtracting each of the three sensing currents outputted from the three sensing areas to which one of said colored filter elements is assigned, from the forth sensing current obtaining color signals proportional to the red, green and blue content of said incident light, and
- wherein the four sensing areas (21-24) of said sensing unit are of unequal size and wherein the ratios of the sizes of said sensing areas compensate for infrared transmission differences of the filter elements.

16. Method of sensing the color contents of incident light as claimed in claim 15, wherein said sensing unit comprises either a photo diode divided into four sensing areas or four photo diodes.

17. Method of sensing the color contents of incident light as claimed in claim 15, wherein said filter elements (31-34) are provided by printing colors onto the surface of the sensing unit.

18. Method of sensing the color contents of incident light as claimed in claim 15, wherein said filter elements (31-34) comprise printed or plastic color sheets.

19. Method of sensing the color contents of incident light as claimed in claim 15, wherein the forth filter element (31) is a color correction filter element.

* * * * *